3,795,728
PROCESS FOR MANUFACTURING PHOSPHORIC ACID AND SUBSTANTIALLY ALKALISILICO-FLUORIDE-FREE GYPSUM
Kurt Scheel, Hamburg, Germany, assignor to Gebr. Knauf West-deutsche Gipswerke
No Drawing. Filed Mar. 1, 1972, Ser. No. 231,027
Claims priority, application Germany, Mar. 2, 1972, P 21 09 715.4
Int. Cl. C01f 1/00; C22b 29/00
U.S. Cl. 423—166                 5 Claims

ABSTRACT OF THE DISCLOSURE

Process for the manufacture of phosphoric acid and the obtaining of an essentially alkali-silico-fluoride free gypsum as a byproduct.

About 6 tons of gypsum with a moisture content of 20% by weight, occur per ton of $P_2O_5$ in the preparation of "wet-process" phosphoric acid by the digestion of rock phosphates. In addition to the approximately 10 million tons of $P_2O_5$ that were produced in the world in 1970, sixty millions of waste gypsum were obtained. Hence it follows that the disposal of such large quantities of gypsum presents considerable problems. Lack of necessary space, for example, is one of the reasons why dumping is impossible, at least in industrial countries. In most parts of the world manufacturers are no longer allowed to let the waste gypsum run off into water-ways because of the existing contamination of water-ways, and in particular because of the danger of their eutrophication. Numerous attempts were therefore made to use the waste gypsum for technical purposes. The most important methods are employed in the production of:

(1) Gypsum used as constructional material made by burning.
(2) Ammonium sulphate obtained with the "Merseburg-process."
(3) Cement and sulphuric acid produced by the "Müller-Kühne process."

Although the gypsum which occurs as byproduct in the manufacture of phosphoric acid, contains about 95% by weight of a $CaSO_4.2H_2O$, being hence more concentrated than natural gypsum, very great difficulties are encountered in utilizing the gypsum obtained in this way. Moreover it has found only limited application in the manufacture of above products and particularly in countries, as for example Japan, where deposits of natural gypsum are not available.

The invention is based on the knowledge that the principal short-coming which is the most difficult one to overcome, opposing the use of gypsum occuring in phosphoric acid production, is due to that gypsum's content of alkalisilicofluoride and, in particular, of sodium-silicatefluoride, although said content is only in the order of about 0.5 to 1.5% by weight.

The object of this invention is to provide a modified process for the preparation of phosphoric acid, in which the occuring gypsum is practically free from alkalisilicofluorides.

In conventional phosphoric acid plants, employing mainly the dihydrate process and where the daily output is in the region of 50 to 500 tons of $P_2O_5$, gypsum is suspended in the circulating phosphoric acid. This circulation can be effected via several stirring vessels arranged one behind the other, cascade-like, the phosphoric acid being recycled from the last vessel to the first one.

Circulation can also be carried out in a single vessel of appropriate size which can be subdivided into compartments by the use of partitioning walls. The necessary amounts of rock phosphate and sulphuric acid required for the digestion are fed into that suspension whose contents of solid matter is limited to 30 to 40% by weight so that it can be cycled and stirred without difficulty. A corresponding amount of suspension is drained off at a point where the reaction components are being added. The gypsum is separated from the phosphoric acid by filtration and is washed on the filter. An amount of main filtrate, equivalent to the quantity of rock phosphate employed, is drained off as product acid. The remaining filtrate and the $P_2O_5$ containing wash water are recycled to the digestion system.

For thermodynamic reasons the concentration of the phosphoric acid obtained by the dihydrate process, is limited to 30 to 35% by weight of $P_2O_5$ at the reaction temperatures of 75 to 80° C. employed in practice. If the production is carried out very close to that limit only a limited quantity of water will then be available to wash off the gypsum separated out. That amount will be reduced further by the water fed with the sulphuric acid into the digestion system and particularly when waste sulphuric acid is being used which has, in most cases, a $H_2SO_4$ content of only 70 to 80% by weight. To obtain an optimum washing effect with the amount of water available, washing is done counter-currently in practice reusing the wash filtrate. In the last step only water is used to wash the gypsum. The filtrate obtained there is put back on the filter, mostly in two further washing steps, whereby the $P_2O_5$ content of the wash filtrate increases to 5 to 10% by weight and 15 to 20% by weight respectively.

Employing this working method much of the alkalisilicofluoride, the larger portion of which being sodium-silicofluoride, forming during the digestion of the rock phosphate, remains in the gypsum. This is particularly due to the fact that the rather poor solubility of the alkalisilicofluoride decreases with increasing concentration and is also further decreased by an excess of fluosilicic acid which is present in most cases.

Especially when the production of phosphoric acid is carried out continuously the silicofluorides, including Chukrowite $Ca_4[SO_4.SiF_6.AlF_6(OH)].12H_2O$ will accumulate in the gypsum.

To prevent thick deposits, consisting mainly of alkalisilicofluorides from forming on the cloth of the filters, while the gypsum is being separated from the phosphoric acid by filtration, it is recommended in German Pat. 665,789 to add phosphoric acid which is largely free from alkalisilicofluoride, in such an amount and having an adequate temperature, to the digestion mixture composed of sulphuric acid and rock phosphate, enabling the saturation limit of the alkalisilicofluoride present in the phosphoric acid contained in the reaction mixture, to be greatly reduced. That process has the disadvantages that noticeable amounts of alkalisilicofluorides will nevertheless remain in the gypsum, and that the acid produced contains an undesirably high proportion of silicofluorides. These disadvantages can be attributed to the fact that the amount of recycled phosphoric acid is relatively small. It constitutes only 20% of the total output from which the silicofluorides have not even been entirely separated.

A process was found for the preparation of phosphoric acid by the digestion of rock phosphate with sulphuric acid and another one for obtaining gypsum suitable for further processing and utilization, the gypsum being separated from the phosphoric acid and washing the gypsum reusing the wash filtrate. The gypsum separated from the phosphoric acid is then leached with hot wash filtrate which has been saturated with alkalisilicofluoride in cold water, and the alkalisilicofluoride contained in the extract separated from the gypsum is separated by crystallization, the mother liquor obtained thereby being recycled to the production circuit.

After the separation of the main filtrate the phosphoric acid still contained in the gypsum remaining as filter cake, is washed with a wash filtrate that has been saturated with alkalisilicofluoride in cold water and is then removed and recycled.

The wash filtrate obtained in this process can be cold when used. However, if rock phosphate with a particularly high alkali content has to be used or if gypsum is to be obtained having a particularly high degree of purity, it is advantageous to heat the wash filtrate prior to transferring it onto the filter of this first washing step.

In that case it is advantageous to liberate the filtrate —separated again from the gypsum—from the precipitated silicofluorides by cooling, stirring and filtration or with a centrifuge. The filtrate occurring thereby is recycled to the digestion process. Normally, it need not be reheated before this since, while the exothermic digestion is taking place, large amounts of heat are evolved which have to be removed anyway.

If the wash filtrate used for washing the gypsum is cold when used it may, after its separation from the gypsum, be recycled to the digestion process without any further intermediate treatment.

This first wash filtrate, separated from the gypsum, is normally combined with the excess of the main filtrate exceeding the amount of acid produced that is withdrawn. In this way the concentration of the "recycled acid" has the desired content of 20 to 25% by weight of $P_2O_5$. With modern filtering plants the prefiltrate contaminated with solid particles which passed the filter, is also added to that mixture. This measure is particularly advantageous if the wash filtrate, employed to wash the gypsum, is hot when used. In this case it is recommended to introduce the excess main filtrate and prefiltrate into the cooling circuit of the wash filtrate. By this measure a desirable increase of the amount of alkalisilicofluoride to be removed is obtained, because the latter's solubility in phosphorus acid decreases with increasing acid concentration.

Hot water is used for leaching further amounts of alkalisilicofluoride out of the gypsum treated with hot or cold wash filtrate. The counter-current system usually employed in leaching operations can be used. The alkalisilicofluoride crystals obtained by cooling are separated by filtration or centrifugal filtration from this wash solution containing in addition to all the silicofluoride, also small amounts of phosphoric acid that were not fully removed by the first wash and which can have a $P_2O_5$ content of 5 to 10% by weight. The cold saturated mother liquor obtained in this way can be used, as described above, to wash the gypsum after the phosphoric acid was separated out by filtration. It is also possible, however, to let it circulate continuously after it was reheated in the second washing step.

This second washing zone is provided with a further cooling system which is instrumental in discharging the alkalisilicofluoride separated from the gypsum at this point. The $P_2O_5$ concentration of the wash solution circulating in this zone can be as high as 15% by weight. Wash filtrate of the third zone is fed to this second zone, from which the excess quantity that was preheated, if necessary, to temperatures of preferably 60 to 80° C., is transferred to the first wash zone. This second wash circuit can be dispensed with in special cases as, for example, when "good natured" rock phosphates are being processed or when the quality of the gypsum may be low.

Finally, in the third wash zone, the gypsum is washed again with pure water that can also be preheated, if necessary, to a temperature of 60 to 80° C.

If the concentration of the phosphoric acid produced is to be as high as possible then, as mentioned before, only a limited amount of water will be available for washing the gypsum. It may occur that this amount of water available from the $P_2O_5$ in circulation, will not suffice to separate the entire amount of alkalisilicofluoride from the gypsum, that fluoride forming when crude rock phosphate rich in alkali, as for example, rock phosphate for Gafsa, containing about 1.2% by weight of $Na_2O$, is being processed. In such cases, in accordance with the invention, the wash filtrates in the respective circuit are to be recycled for leaching by cooling, crystallization, separation and reheating.

Only the amount of water fed with the wash water to the last wash of the gypsum is then discharged from the respective circuit in the form of cold saturated mother liquor and is fed into the preceding one.

One of the applications of the process of this invention is consequently characterized by the combination of following steps:

(a) The phosphoric acid remaining in the gypsum subsequent to the withdrawal of the acid produced is displaced by washing with cold wash filtrate saturated with alkalisilicofluoride and is recycled with them to the digestion step.

(b) The alkalisilicofluorides remaining in the gypsum are extracted with hot wash solutions preferably kept in circulation.

(c) The alkalisilicofluoride crystals obtained by cooling are separated from the wash solution removed from the gypsum.

(d) The wash filtrate saturated cold with alkalisilicofluorides obtained in Step (c) is used to wash the gypsum in Step (a).

(e) After the extraction and separation of the wash solution the gypsum is washed with water which, after reheating, was used entirely or in part as wash solution in Step (b).

The other example of operation of the process of the present invention is essentially characterized by the fact that the wash filtrate saturated cold with alkalisilicofluorides is preheated before it is used to wash the gypsum after the acid produced was separated. The wash filtrate, which was separated from the acid produced can be used for this. That filtrate was cooled after the removal from the gypsum and is separated from the alkalisilicofluoride discharged thereby, while the occurring mother liquor is recycled to the digestion step.

It was also found that the gypsum, particularly during the first wash, reacts with alkalisilisofluoride. This undesired reaction talkes place as follows:

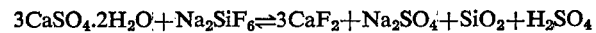

$3CaSO_4 \cdot 2H_2O + Na_2SiF_6 \rightleftharpoons 3CaF_2 + Na_2SO_4 + SiO_2 + H_2SO_4$ whereby insoluble calcium fluoride is formed. This occurs particularly at the end of the first wash of the gypsum, carried out with pure water, to separate the acid.

According to this invention that conversion is driven back by acidulating the wash water. A sufficient effect is obtained by adjusting the pH value to 4, preferably to 3 to 1. It is expedient to carry out the acidulation with sulphuric acid because same gets into the digestion step so that sulphuric acid can be saved on there.

Since the solubility of the alkalisilicofluorides is very temperature dependent the leaching of the gypsum should be carried out at a high temperature whereas the crystallization of the alkalisilicofluorides should take place at a low temperature. In phosphoric acid plants leaching operations are carried out at temperatures ranging from 70 to 100° C., preferably from 80 to 90° C., and the crystallization at a temperature which lies about 10° C. above outdoor temperature, i.e. at about 10 to 30° C.

The cooling of the wash liquor for the crystallization of the alkalisilicofluorides contained in it, can be carried out in known equipment, as for example, in cooling vessels into which, one by one, the liquor is introduced in an appropriate manner and which are cleared after the crystallization of the salt. Cooling towers and especially vacuum cooling installations, as for instance, the Swenson vacuum crystallizer are used with larger plants. The time of retention of the wash liquors in these crystallization devices can vary from 1 to 10 hours, the crystallization of the alkalisilicofluorides being favorably influenced by the presence of seed crystals and by stirring. For an extensive separation of the silicofluorides in a cooling basin a retention time is necessary i.e. of about 6 to 10 hours. In a vacuum crystallizer with stirrer the retention time may be reduced to 1 to 2 hours.

Further, it is also known that appreciable amounts of excess heat occur when phosphoric acid is produced by the wet process, the amount of heat being determined mainly by the concentration of the sulphuric acid employed. In phosphorous acid plants the excess heat is removed either by blowing air onto the surface of the suspension circulating in the reaction vessel or by pumping same through a vacuum cooler. The acid droplets carried away by the cooling air and the fluorine containing gases forming during the digestion are washed out in a large washing unit used in conjunction with the cooling by air, seeming simpler at first. The money and work expended on cooling the reaction mixture can be saved if, according to the invention, the amount and the temperature of the wash solution recycled from the first wash step are adjusted accordingly. If, for example, the amount of heat removed, to allow the crystallization of the alkalisilicofluorides to take place, should be larger than necessary to maintain the digestion temperature at about 80° C., the wash solution to be fed again into the digestion step must be reheated. This necessity may arise, for example, when very weak waste sulphuric acid is being used. Conversely, if excess heat is still present while contact sulphuric acid is being employed, part of the hot main filtrate can be withdrawn and also fed into the vacuum cooler. Since the solubility of the alkalisilicofluoride decreases as the phosphoric acid concentration rises, a very desirable further increase of the amount of eliminated alkalisilicofluoride can be obtained.

Modern filtering plants, as for example, rotary filters, enable a smaller amount of first filtrate to be withdrawn, prior to the actual main filtrate proper. In accordance with the invention that very prefiltrate can be introduced into the cooling circuit. In addition to increasing the amount of heat removed other improvements are obtained in this way. The prefiltrate becomes turbid by a small or larger amount of fine solids that pass the filter before the filter cake has formed on it. Moreover, the first filtrate is considerably dilute, due to the water retained in the filter cloth and in the tiltable suction filter, water which remained behind from the wash zone of the filter, the prefiltrate having lost some of its heat anyway which was taken up by the parts of the equipment used. By the withdrawal of the prefiltrate a clearer, somewhat higher concentrated and hotter main filtrate is thus obtained, in addition to the improvement of the temperature adjustment in the digestion step. This advantage benefits especially the evaporation step which is usually linked to a larger phosphoric acid plant and in which the phosphoric acid is evaporated from 32% by weight of $P_2O_5$ to the commercial grade of 54% by weight $P_2O_5$.

While most crude rock phosphates used in phosphoric acid production as, for example, Florida pebble phosphate, contain sufficient amounts of silicio acid enabling, during digestion, the conversion of their entire fluorine content to produce fluosilic acid, there are rock phosphates of which this cannot be said. Rock phosphate from Marocco, for example, has an average content of about 4.0 to 4.2% by weight of fluorine, but contains only 2 to 3% by weight of $SiO_2$ which, mathematically, should be sufficient for the formation of fluosilic acid. The digestion mixture prepared with the phosphate contains, however, considerable amounts of fluorine, present partly as fluosilic acid, partly in the form of hardly soluble calcium fluoride that cannot be separated from the gypsum by leaching.

The latter compounds, however, prove a very great disadvantage to the further processing of the gypsum. To enable the complete conversion of the fluorine to fluosilic acid to take place, a sufficient amount of silicic acid can, in accordance with the invention, be introduced into the process. This can be effected, for example, by the addition of sand which, in view of its low reactivity, is added to the rock phosphate during grinding already. More reactive forms of the silicic acid, as for example, siliceous earth or silicic acid slurry which occurs e.g. in the absorption plant for $SiF_4$, are more suitable for this purpose. Quantitative conversion of the fluorine to silicofluoride can also be achieved by the addition of sodium silicate, whereby a larger amount of alkalisilicofluoride is precipitated at the same time.

According to one example of operation of the process of this invention the gypsum is washed only on the filter, this operation being done in two different manners:

Mother liquor saturated cold with silicofluorides is used to displace the rest of the main filtrate remaining after the removal of the phosphoric acid. The gypsum is then leached with hot wash liquor containing about 5 to 10% by weight of $P_2O_5$, kept in circulation in a vacuum crystallizer and is finally washed again thoroughly with pure water. The quality of the gypsum obtained in this way is entirely sufficient for many uses, as for instance, the production of sulphuric acid and cement by the Müller-Kühne process.

As provided already by the other example of operation of the invention the gypsum, remaining after the withdrawal of the phosphoric acid, is treated with a hot mother liquor saturated with alkalisilicofluoride. This method is, as said before, especially indicated when rock phosphates with particularly high alkali content are to be processed or when gypsum of high purity is to be obtained.

In some cases, however, as for example in the preparation of gypsum for stuccowork and plastering or of ammoniumsulphate by the Merseburg process, some further substances contaminating the phosphoric acid gypsum are found to be troublesome. These impurities are chiefly socalled organic substances, bituminous constituents which are contained in the rock phosphate. They impart an undesired brownish color to the gypsum and to products made therefrom. It is known that these impurities can be separated from the gypsum by flotation. In accordance with the invention this flotation can be carried out in conjunction with the hot leaching, thus saving one operation. According to this variant of the process of the invention the gypsum is removed from the filter on the displacement of the phosphoric acid main filtrate. The gypsum is suspended in the hot, circulating mother liquor and the organic substance contained in it is separated out by flotation. The gypsum is then separated by filtration or centrifugal filtration and is washed with pure water. After the crystallization in a suitable crystallizer, as for example, in a vacuum crystallizing apparatus, the alkalisilicofluoride is separated from the hot mother liquor by centrifugal filtration. The mother liquor remaining afterwards can be recycled and introduced into the process.

The fact that the gypsum can be removed, preferably early, from the main filter is a further significant advantage of the measure suggested i.e. combining the flotation with the hot leaching of the gypsum. In this way a considerable portion of the filtering surface is kept clear. But as the filter is usually the bottleneck of a phosphoric acid plant, the addition of an installation, as provided by the invention, for the processing of gypsum will lead to a considerable increase in capacity of the phosphoric acid plant.

Consequently, in accordance with the invention, it is possible to remove the silicofluorides to which, with the scope of the invention, belongs also Chukrowite

$Ca_4[SO_4 \cdot SiF_6AlF_6(OH)] \cdot 12H_2O$ apart from the alkalisilicofluorides, from the gypsum obtained in the preparation of phosphoric acid by the digestion of crude rock phosphate with sulphuric acid. The gypsum obtained in this manner can be utilized without any difficulties.

EXAMPLE

In a phosphoric acid plant, operating by the calcium sulphate-dihydrate process there are 260 cbm. of a suspension composed of gypsum in phosphoric acid containing 32% by weight of $P_2O_5$ circulating at 78° C. in an annular reactor of a known type. The amount of solid matter contained in the suspension is about 35% by weight. 13 tons of finely ground Florida pebble phosphate of following analysis are fed into the system every hour:

|  | Percent |
|---|---|
| $P_2O_5$ | 33.00 |
| $SO_3$ | 0.85 |
| F | 3.80 |
| $CO_2$ | 3.30 |
| $SiO_2$ | 6.80 |
| $TiO_2$ | 0.85 |
| CaO | 48.00 |
| MgO | 0.30 |
| $Fe_2O_3$ | 1.50 |
| $Al_2O_3$ | 0.80 |
| $Na_2O$ | 0.52 |
| $K_2O$ | 0.14 |
| Loss of ignition without $CO_2$ | 1.74 |

32 tons with 25% by weight of $P_2O_5$ and having a temperature of about 50° C., stemming from the first wash zone as indicated below, are fed into the system at the same time. At one or several points of the circuit lying behind the point where rock phosphate is being introduced, 14.7 tons of 78% sulphuric acid are added every hour in such a way that the $SO_4$ content of the circulating phosphoric acid is about 2% by weight.

The suspension overflowing from the reactor, about 58 tons/h. is pumped via a storage vessel onto the rotary filter. 13 tons/h. of the main filtrate containing 32% by weight of $P_2O_5$ are withdrawn as product acid. The plant's daily output is thus 100 tons of $P_2O_5$. 15 tons/h. of mother liquor containing about 10% by weight of $P_2O_5$ and having a temperature of approx. 30° C., coming from the silicofluoride crystallization, are transferred onto the subsequent first wash zone of the filter, whereby the main quantity of phosphoric acid is displaced from the filter cake.

The filtrate is combined with the prefiltrate of the filter and the main filtrate in excess of the quantity withdrawn to be added to the 32 tons being recycled to the reactor.

The gypsum cake is then washed on the filter in two further zones and the silicofluoride contained in its is separated out. 25 tons/h. of hot wash acid (80 to 90° C.) containing 5 to 10% by weight of $P_2O_5$ and from which the extracted silicofluoride is separated by crystallization taking place while cooling in circulation, as used in the second wash zone. In that circulation the liquor is cooled to 30° C. in a vacuum crystallizer and the silicofloride crystals, 200 to 250 kgs. per hour, are separated out in a pusher centrifuge. 15 tons of the cold mother liquor are withdrawn per hour for the washing of the gypsum cake in the first wash zone. The remaining amount is combined in a storage vessel with the wash filtrate of the third and last zone of the filter, and after being reheated to 80 to 90° C. in a heat exchanger it is recycled to the second zone, the leaching step.

In the third wash zone of the filter the gypsum is washed with 13.6 tons of water per hour, adhering mother liquor being removed thereby.

25 tons of gypsum containing 20% $H_2O$ are removed from the filter each hour. The gypsum is free of alkalisilicofluorides and is highly suitable for most purposes.

EXAMPLE 2

In the plant according to Example 1 there are 260 cbm. of a suspension composed of gypsum in phosphoric acid containing 32% by weight of $P_2O_5$ circulating at a temperature of 78° C. 13.1 tons of Marocco phosphate containing 34% by weight of $P_2O_5$, 4% by weight of F and 0.48% by weight of Na which was ground to a fineness of 85% by weight of the grains are smaller than 0.15 mm. and which was mixed with 3% by weight of reactive silicic acid in the form of kieselguhr.

30 tons return flow acid with 25% by weight of $P_2O_5$ are fed into the circulating mixture at the same time. This acid is received by mixing the filtrate from the first wash zone of the filter with the prefiltrate of the filter. The silicofluoride contained in this acid is separated by cooling and isolated by filtration.

The $SO_3$ contents of the acid contained in the reaction space will be adjusted at 1.5 to 2.0% by weight by admixing of 14.7 tons per hour of sulfuric acid with 75% by weight of $H_2SO_4$.

The suspension overflowing from the reactor is pumped via a storage vessel onto a rotary filter and is filtered. The residual gypsum is then washed on the filter in two procedures at a temperature from 70 to 90° C. with wash filtrate from which the silicofluoride was separated by cooling and isolated. In the third wash zone the gypsum is superposed with 13 tons per hour of water, which contains 1% by weight of sulfuric acid. With this measure the gypsum is liberated from mother liquor.

From the cooling circular course of the first wash zone including the prefiltrate 150 kg. per hour of crystals are isolated which are contaminated with gypsum and which contain 32% by weight of fluorine. From the cooling circular course of the second wash zone 170 kg. per hour of crystals are isolated with a fluorine content of 38% by weight. With these measures 75% by weight of the alkali contained in the raw phosphate is removed from the reaction mixture. The rest of the alkali remains in the phosphoric acid produced. The fluorine content of the gypsum is lower than 0.1% by weight, the sodium content is lower than 0.02 by weight and potassium is detectable only as traces.

EXAMPLE 3

In the plant according to Example 1, 9 tons per hour of finely ground Kola phosphate with a fineness of 95% by weight smaller than 0.15 mm. will be decomposed with 11 tons per hour of sulfuric acid with 75% by weight of $H_2SO_4$. This performance correspond to a daily production in the range of 80 tons of $P_2O_5$. This very fine grained phosphate will be mixed in a spiral mixer with return flow phosphoric acid containing 25% by weight of $P_2O_5$. Because this phosphate has a small content of impurities only one of the cooling circuits is necessary for the isolation of the silicofluoride.

A white and extra pure gypsum is yielded which contains less than 0.05% by weight of fluorine, 0.02% by weight of sodium and 0.02% by weight of potassium. This gypsum is useful for most technical purposes.

What we claim is:

1. A process for the production of an essentially alkali-silicofluoride free gypsum from rock phosphate digestion which comprises:
   (a) digesting rock phosphate with sulfuric acid;
   (b) separating the gypsum from the phosphoric acid;
   (c) washing the gypsum with wash filtrate;
   (d) washing the gypsum with hot wash filtrate which is at a temperature of about 70 to 100° C. and which contains an amount of alkalisilicofluoride corresponding to a saturating quantity at a filtrate temperature of about 10 to 30° C.;

(e) cooling the filtrate to separate out alkalisilicofluoride and recycling the wash filtrate; and (f) washing the gypsum with water to obtain gypsum essentially free of alkalisilicofluoride.

2. A process according to claim 1 in which the temperature in Step (d) is about 80 to 90° C.

3. A process according to claim 1 in which a compound selected from the group of silicic acid and alkali silicate is added during the digestion Step (a).

4. A process according to claim 3 in which the compound added is silicic acid.

5. A process according to claim 1 in which the retention time in Step (e) is about 1 to 10 hours.

References Cited

FOREIGN PATENTS

| 776,557 | 1/1968 | Canada | 23—165 |
| 1,104,738 | 2/1968 | Great Britain | 23—122 |
| 590,594 | 1/1960 | Canada | 23—122 |

OSCAR R. VERTIZ, Primary Examiner

G. HELLER, Assistant Examiner

U.S. Cl. X.R.

423—320, 341